(12) United States Patent  
Yasuda (10) Patent No.: US 10,951,093 B2  
(45) Date of Patent: Mar. 16, 2021

(54) ROTARY ELECTRIC MACHINE WITH LIQUID COOLANT

(71) Applicant: HONDA MOTOR CO., LTD., Tokyo (JP)

(72) Inventor: Norifumi Yasuda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 2 days.

(21) Appl. No.: 16/285,341

(22) Filed: Feb. 26, 2019

(65) Prior Publication Data

US 2019/0273420 A1 Sep. 5, 2019

(30) Foreign Application Priority Data

Mar. 2, 2018 (JP) .............................. JP2018-037554

(51) Int. Cl.
| | |
|---|---|
| *H02K 9/19* | (2006.01) |
| *H02K 3/24* | (2006.01) |
| *H02K 1/20* | (2006.01) |
| *H02K 5/20* | (2006.01) |
| *H02K 3/46* | (2006.01) |

(Continued)

(52) U.S. Cl.
CPC ................. *H02K 9/19* (2013.01); *H02K 1/20* (2013.01); *H02K 1/32* (2013.01); *H02K 3/24* (2013.01); *H02K 3/32* (2013.01); *H02K 3/46* (2013.01); *H02K 5/20* (2013.01)

(58) Field of Classification Search
CPC ........... H02K 9/19; H02K 9/193; H02K 1/20; H02K 1/32; H02K 5/20; H02K 3/24; H02K 3/32; H02K 3/46

USPC ......................................... 310/54, 58, 59, 61
See application file for complete search history.

(56) References Cited

U.S. PATENT DOCUMENTS

| | | | | |
|---|---|---|---|---|
| 2,873,393 A | * | 2/1959 | Baudry ..................... | H02K 9/12 310/55 |
| 2010/0045125 A1 | * | 2/2010 | Takenaka ................. | H02K 9/19 310/54 |

(Continued)

FOREIGN PATENT DOCUMENTS

| | | |
|---|---|---|
| CN | 101953052 | 1/2011 |
| CN | 102906969 | 1/2013 |

(Continued)

OTHER PUBLICATIONS

Chinese Office Action for Chinese Patent Application No. 201910135976.2 dated Aug. 12, 2020.

(Continued)

*Primary Examiner* — Michael Andrews  
(74) *Attorney, Agent, or Firm* — Amin, Turocy & Watson, LLP (57) ABSTRACT

A rotary electric machine includes a rotor that rotates integrally with a rotary shaft and a stator disposed outside the rotor in a radial direction. In the stator, a coil is wound on a stator core, and a coil end of the coil exposed to an outside from an end portion of the stator core is cooled by a liquid coolant. The rotary electric machine further includes a coil end cover formed of an insulating material and configured to cover at least an outer circumference of an upper region of the coil end. A liquid coolant passage through which a liquid coolant flows toward a coil end is provided in the coil end cover.

5 Claims, 6 Drawing Sheets

(51) Int. Cl.
*H02K 3/32* (2006.01)
*H02K 1/32* (2006.01)

(56) References Cited

U.S. PATENT DOCUMENTS

| | | | | |
|---|---|---|---|---|
| 2010/0264760 A1* | 10/2010 | Matsui | ............... | H02K 9/19 |
| | | | | 310/54 |
| 2011/0316367 A1* | 12/2011 | Takahashi | ............ | H02K 9/19 |
| | | | | 310/54 |
| 2017/0271955 A1* | 9/2017 | Hanumalagutti | ...... | B60K 1/00 |
| 2017/0271957 A1* | 9/2017 | Hanumalagutti | ...... | H02K 5/20 |

FOREIGN PATENT DOCUMENTS

| | | |
|---|---|---|
| CN | 103532307 | 1/2014 |
| CN | 103545986 | 1/2014 |
| CN | 105917555 | 8/2016 |
| CN | 106787452 | 5/2017 |
| CN | 107204684 | 9/2017 |
| CN | 107306056 | 10/2017 |
| JP | 52-51903 | 7/2013 |
| JP | 2014-107905 | 6/2014 |

OTHER PUBLICATIONS

Chinese Office Action for Chinese Patent Application No. 201910135976.2 dated Dec. 16, 2020.

\* cited by examiner

ROTARY ELECTRIC MACHINE WITH LIQUID COOLANT

CROSS-REFERENCE TO RELATED APPLICATION

Priority is claimed on Japanese Patent Application No. 2018-037554, filed Mar. 2, 2018, the content of which is incorporated herein by reference.

BACKGROUND OF THE INVENTION

Field of the Invention

The present invention relates to a rotary electric machine configured to perform cooling using a liquid coolant.

Description of Related Art

As a rotary electric machine mounted on a vehicle or the like, a rotary electric machine including a rotor integrally rotated with a rotary shaft and a stator disposed outside the rotor in a radial direction, and in which a plurality of permanent magnets are disposed on an outer circumference of the rotor and a coil is wound on the stator, is provided. In such a rotary electric machine, a coil end portion of the coil of the stator can easily generate heat during an operation.

As a countermeasure against this, a rotary electric machine in which a coil end portion on a state side is cooled by a liquid coolant is known (for example, see Japanese Patent No. 5251903).

In the rotary electric machine disclosed in Japanese Patent No. 5251903, an exhaust port for the liquid coolant is disposed at a position above the coil end in the housing, and a reservoir part configured to store a liquid coolant discharged from the exhaust port and bounced at the coil end portion is disposed at a position facing an outer circumferential side surface of the coil end. An inlet opening configured to accommodate the liquid coolant bounced by an outer surface of an upper region of the coil end is provided in an upper section of the reservoir part, and an outlet opening configured to supply the liquid coolant stored in the reservoir part to an outer surface of a lower region of the coil end is provided in a lower section of the reservoir part.

SUMMARY OF THE INVENTION

However, since the rotary electric machine in the related art has a structure in which the liquid coolant bounded by the outer surface of the upper region of the coil end is captured at the inlet opening of the reservoir part and supplied onto the outer surface of the lower region of the coil end from the outlet opening, when a flow of the liquid coolant discharged from the exhaust port to the coil end is varied or the like, the liquid coolant bounced by the coil end cannot be stably captured at the inlet opening.

For this reason, in the rotary electric machine in the related art, it is difficult to stabilize a wraparound state of the liquid coolant with respect to the coil end (a cooling state by the liquid coolant).

An aspect of the present invention provides a rotary electric machine capable of stably cooling a coil end portion of a coil wound on a stator using a liquid coolant.

A rotary electric machine according to the present invention employs the following configurations.

(1) A rotary electric machine according to an aspect of the present invention includes a rotor that rotates integrally with a rotary shaft and a stator disposed outside the rotor in a radial direction, a stator core of the stator is wound by a coil and a coil end of the coil exposed to an outside from an end portion of the stator core is cooled by a liquid coolant, and wherein a coil end cover formed of an insulating material and configured to cover at least an outer circumference of an upper region of the coil end is further provided, and a liquid coolant passage through which a liquid coolant flows toward the coil end is provided in the coil end cover.

According to the configuration of (1), when the liquid coolant is introduced to the liquid coolant passage of the coil end cover, the liquid coolant is supplied to the coil end portion covered with the coil end cover. Since at least the outer circumference of the upper region of the coil end is covered with the coil end cover, the liquid coolant supplied from the liquid coolant passage is smoothly spread in a wide range of the coil to flow downward. Since the coil end cover is formed of an insulating material, the coil end cover can be disposed sufficiently closer to the coil end to which a high voltage is applied. Accordingly, in the rotary electric machine according to the present invention, large rebounding of the liquid coolant at the coil end can be suppressed and a wide range of the coil end can be stably cooled by the liquid coolant.

(2) In the aspect of (1), a part of the liquid coolant passage may be provided to come into contact with an end surface of the stator core.

In this case, since some of the liquid coolant supplied to the liquid coolant passage in the coil end cover flows to come into contact with the end surface of the stator core, the stator core can also be cooled by the liquid coolant.

(3) In the aspect of (1) or (2), the coil end cover may be formed to cover an entire outer circumference of the coil end.

In this case, the liquid coolant is easily spread throughout the outer circumference of the coil end. For this reason, the coil end can be more efficiently cooled by the liquid coolant.

(4) In the aspect of any one of (1) to (3), the coil end cover may include a first coil end cover configured to cover the coil end of one end side of the stator in an axial direction and a second coil end cover configured to cover the coil end of the other end side of the stator in the axial direction, and the first coil end cover and the second coil end cover may be connected by a liquid coolant pipe configured to supply a liquid coolant to the liquid coolant passage.

In this case, the liquid coolant can be supplied to the coil end of one end side and the coil end of the other end side in the axial direction of the stator by a compact configuration.

(5) In the aspect of (4), a liquid coolant discharge hole configured to discharge a liquid coolant to the stator core may be formed in the liquid coolant pipe.

In this case, the stator core can also be efficiently cooled by the liquid coolant discharged from the liquid coolant pipe.

(6) In the aspect of any one of (1) to (3), the coil end cover may include a first coil end cover configured to cover the coil end of one end side of the stator in an axial direction and a second coil end cover configured to cover the coil end of the other end side of the stator in the axial direction, and a liquid coolant passage of the first coil end cover and a liquid coolant passage of the second coil end cover may be connected by a core passage formed in the stator core.

In this case, the liquid coolant can be supplied to the coil end of one end side and the coil end of the other end side in the axial direction of the stator in a more compact configuration. In addition, the stator core can also be cooled by the liquid coolant flowing through the core passage in the stator core.

(7) In the aspect of any one of (1) to (6), a rotor-side liquid coolant passage configured to inject and supply a liquid coolant to an inner circumferential section of the coil end may be provided in the rotor.

In this case, the coil end can also be cooled by the liquid coolant from the inner circumferential side as well as from the outer circumferential side.

The aspect of the present invention includes the coil end cover configured to cover at least the outer circumference of the upper region of the coil end, the coil end cover being formed of an insulating material, and the liquid coolant passage through which the liquid coolant flows toward the coil end being provided in the coil end cover. Accordingly, when the rotary electric machine of the present invention is employed, the liquid coolant can be smoothly spread on the coil end within a wide range of at least the upper region of the coil end, the coil end portion of the coil can be stably cooled by the liquid coolant.

DETAILED DESCRIPTION OF THE INVENTION

Hereinafter, embodiments of the present invention will be described with reference to the accompanying drawings. Further, in the embodiments described below, common parts are designated by the same reference numerals, and overlapping description thereof will be omitted.

First, a first embodiment shown in FIG. 1 and FIG. 2 will be described.

Figure 1:
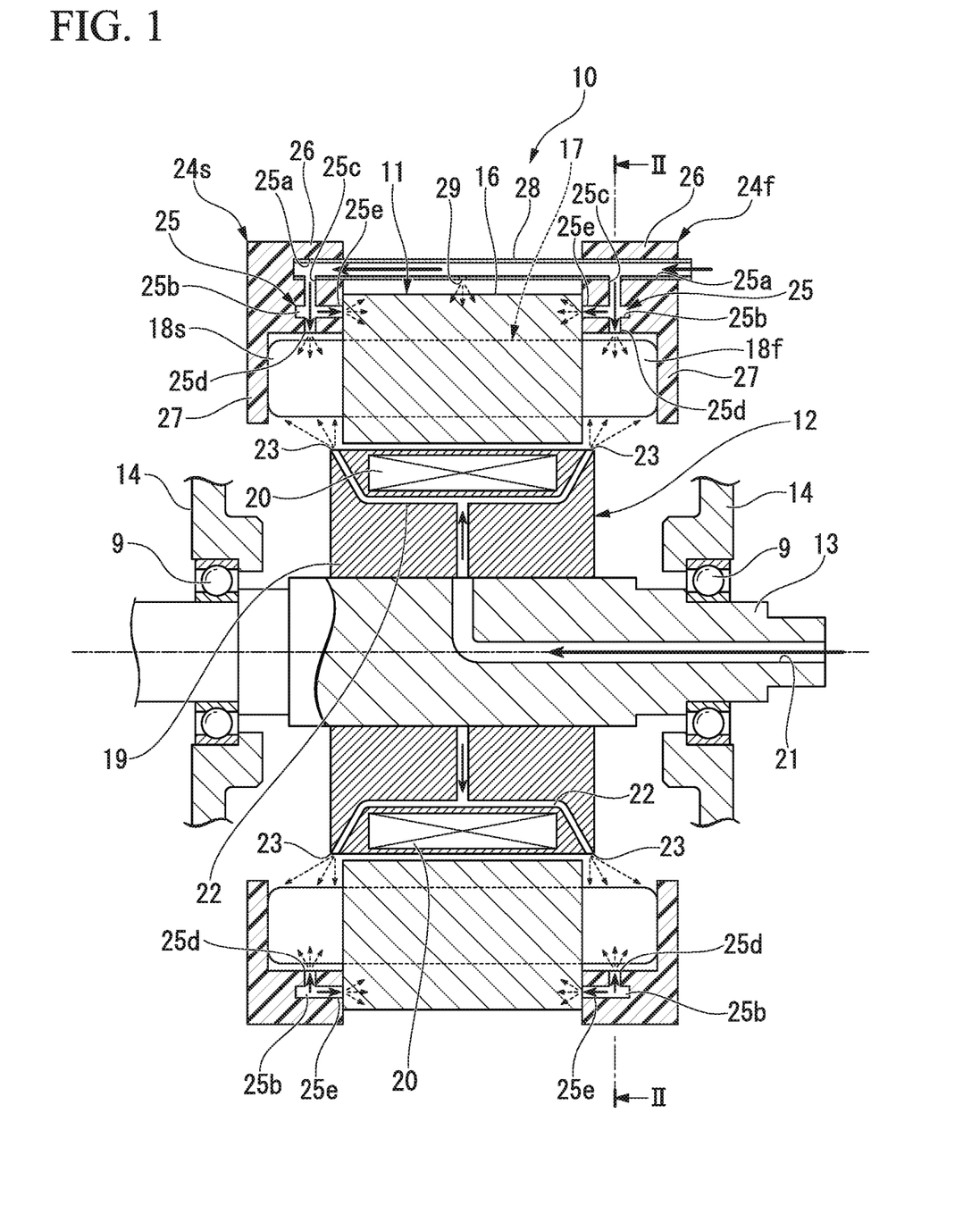
FIG. 1 is a longitudinal cross-sectional view of a rotary electric machine of a first embodiment of the present invention.
Figure 2:
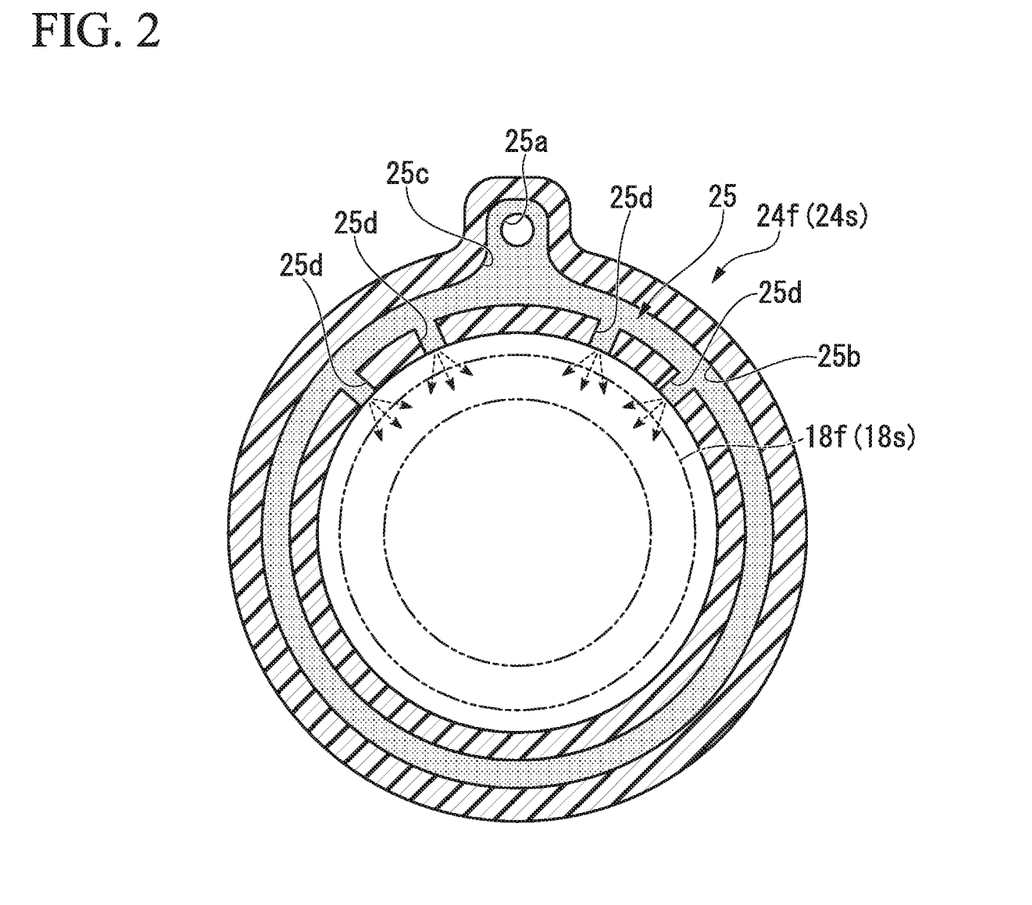
FIG. 2 is a cross-sectional view of the rotary electric machine of the first embodiment of the present invention taken along line II-II in FIG. 1.

FIG. 1 is a view showing a longitudinal cross section of a rotary electric machine 10 of the first embodiment in an axial direction, and FIG. 2 is a view showing a cross section taken along line II-II in FIG. 1.

For example, the rotary electric machine 10 of the embodiment is used for a driving source of an electric vehicle. The rotary electric machine 10 includes a stator 11 configured to generate a rotating magnetic field, a rotor 12 configured to rotate by receiving a rotating magnetic field generated by the stator 11, a rotary shaft 13 installed coaxially with the rotor 12, and a housing 14 configured to hold the stator 11 therein and cover the outside of the rotor 12 and the stator 11.

The stator 11 has a stator core 16, which has a substantially cylindrical shape and is obtained by laminating a plurality of electromagnetic steel sheets, and a coil 17 wound on an edge portion of the stator core 16 on an inner circumferential side. The coil 17 is constituted by a three-phase coil having a U phase, a V phase and a W phase. The coil 17 of the embodiment is constituted by segment coils that are connected to each other and used. Each of the segment coils is constituted by a conductive segment body having a pair of insertion sections inserted into slots of the stator core 16 and a turnup connection section configured to connect the insertion sections. End portions of the pair of insertion sections opposite to the turnup connection section become connecting sections connected to the other neighboring conductive segment bodies.

In the coil 17, the connecting section of each of the conductive segment bodies is disposed on one end side of the stator 11 in an axial direction, and the turnup connection section is disposed on the other end side of the stator 11 in the axial direction. The connecting section and the turnup connection section protrude outward from the end portions of the stator 11 in the axial direction (are exposed to the outside). The connecting section and the turnup connection section constitute coil ends 18*f* and 18*s* of the coil 17. An external power line is connected to the coil end 18*f* of one side. Current is applied to the coil 17 through the power line.

The rotor 12 has a rotor core 19 integrally coupled to an outer surface of the rotary shaft 13, and a plurality of permanent magnets 20 disposed on an outer circumferential edge portion of the rotor core 19 separately from each other in the circumferential direction. The rotor core 19 is formed by laminating a plurality of electromagnetic steel sheets in a substantially cylindrical shape. The rotary shaft 13 is rotatably supported by the housing 14 via a bearing 9. The rotary shaft 13 rotates integrally with the rotor 12 as the rotor 12 rotates by receiving a rotating magnetic field of the stator 11.

A liquid coolant introduction passage 21 configured to introduce a liquid coolant into the rotor 12 is formed in a shaft center section of the rotary shaft 13. The liquid coolant introduction passage 21 is connected to a pump apparatus (not shown), and the liquid coolant supplied from the pump apparatus is introduced thereinto.

In addition, a rotor-side liquid coolant passage 22 is provided on the rotor core 19 of the rotor 12.

The rotor-side liquid coolant passage 22 is a passage through which the liquid coolant introduced from the liquid coolant introduction passage 21 of the rotary shaft 13 flows to both end portions of the rotor 12 in the axial direction via a vicinity of the permanent magnets 20. The liquid coolant flowing through the rotor-side liquid coolant passage 22 cools the vicinity of the permanent magnets 20 of the rotor 12. Discharge ports 23 of the rotor-side liquid coolant passage 22 are provided on outer portions in the radial direction of both ends of the rotor 12 in the axial direction. The liquid coolant flowing out of the rotor-side liquid coolant passage 22 to a part of the discharge port 23 is injected to the outside in the radial direction by a centrifugal force of the rotor 12. The discharge ports 23 are disposed at positions inside the coil ends 18*f* and 18*s* in the radial direction on both sides of the coil 17 on the side of the stator 11. The liquid coolant injected from the discharge port 23 is injected and supplied to inner portions of the coil ends 18*f* and 18*s* in the radial direction.

In addition, a first coil end cover 24*f* configured to cover an outer circumference of the coil end 18*f* of one end side of the stator 11 in the axial direction and a second coil end cover 24s configured to cover an outer circumference of the coil end 18s of the other end side of the stator 11 in the axial direction are installed in the housing 14. In the embodiment, the first coil end cover 24f and the second coil end cover 24s are formed in a substantially annular shape to cover the entire outer circumference of the corresponding coil ends 18f and 18s. In addition, the first coil end cover 24f and the second coil end cover 24s are formed of an insulating material such as an insulating resin or the like. Liquid coolant passages 25 configured to cause the liquid coolant to flow to the corresponding coil ends 18f and 18s are provided in the first coil end cover 24f and the second coil end cover 24s.

Each of the first coil end cover 24f and the second coil end cover 24s has an outer circumferential wall 26 configured to cover the outside of the outer circumferential surface of each of the corresponding coil ends 18f and 18s, and an end wall 27 configured to cover an end surface of each of the corresponding coil ends 18f and 18s outside in the axial direction. Since the first coil end cover 24f and the second coil end cover 24s are formed of an insulating material with no concern for an electrical short circuit, they are disposed sufficiently close to the corresponding coil ends 18f and 18s.

A liquid coolant introduction hole 25a extending in the axial direction of the outer circumferential wall 26 is formed in an upper section of the outer circumferential wall 26 of each of the coil end covers 24f and 24s. In addition, an annular hole 25b is formed along a circumferential surface of the outer circumferential wall 26 in a region further inside in the radial direction than the liquid coolant introduction hole 25a of the outer circumferential wall 26. The annular hole 25b comes in communication with the liquid coolant introduction hole 25a through a connecting passage 25c.

A plurality of injection holes 25d in communication with the annular hole 25b are formed in the inner circumferential surface of the outer circumferential wall 26. The injection holes 25d are formed to be separated from at least an upper half region of the outer circumferential wall 26 in the circumferential direction. The liquid coolant flowing to the annular hole 25b from the liquid coolant introduction hole 25a is discharged toward the outer circumferential surfaces of the corresponding coil ends 18f and 18s through the plurality of injection holes 25d.

In addition, an end surface of the outer circumferential wall 26 inside in the axial direction abuts an end surface of the stator core 16 outside in the axial direction. A plurality of communication holes 25e in communication with the annular hole 25b are formed in the end surface of the outer circumferential wall 26 in the axial direction. Some of the liquid coolant flowing to the annular hole 25b from the liquid coolant introduction hole 25a flows to come in contact with the end surface of the stator core 16 outside in the axial direction through the plurality of communication holes 25e. Accordingly, the end surface of the stator core 16 is cooled by the liquid coolant.

Further, in the embodiment, the liquid coolant introduction hole 25a, the connecting passage 25c, the annular hole 25b, the communication holes 25e and the injection holes 25d constitute the liquid coolant passage 25.

In addition, a liquid coolant pipe 28 is fitted into the liquid coolant introduction hole 25a of the first coil end cover 24f and the liquid coolant introduction hole 25a of the second coil end cover 24s, and both of the liquid coolant introduction holes 25a are connected to each other by the liquid coolant pipe 28. The liquid coolant pipe 28 has one end portion that is connected to a liquid coolant introduction pipeline (not shown). In addition, the liquid coolant pipe 28 is disposed over an apex section of the stator core 16. A liquid coolant discharge hole 29 configured to discharge the liquid coolant toward the stator core 16 is formed in a halfway section of the liquid coolant pipe 28 that faces an upper surface of the stator core 16.

In the rotary electric machine 10 of the embodiment, when the liquid coolant is introduced to the liquid coolant pipe 28 from the liquid coolant introduction pipeline, the liquid coolant flows to the annular holes 25b of the liquid coolant passages 25 of the first coil end cover 24f and the second coil end cover 24s, and the liquid coolant is injected to the outer circumferential surfaces of the corresponding coil ends 18f and 18s through the injection holes 25d. Accordingly, some of the liquid coolant flows downward while going along the coil ends 18f and 18s, and most of the remaining liquid coolant runs downward along the coil ends 18f and 18s while repeating minor rebounding between the outer surfaces of the coil ends 18f and 18s and the inner surfaces of the first coil end cover 24f and the second coil end cover 24s (the inner surface of the outer circumferential wall 26 and the inner surface of the end wall 27). The coil ends 18f and 18s are cooled by the liquid coolant during this moment. In addition, some of the liquid coolant flowing into the annular holes 25b of the first coil end cover 24f and the second coil end cover 24s flows to come into contact with the end surfaces of the stator core 16 through the communication holes 25e and cools the vicinity of the end surface of the stator core 16 during this moment.

Meanwhile, the liquid coolant introduced into the liquid coolant introduction passage 21 of the rotary shaft 13 is injected and supplied to inner regions of the coil ends 18f and 18s in the radial direction through the rotor-side liquid coolant passage 22 of the rotor 12. The inner regions of the coil ends 18f and 18s in the radial direction are cooled by the liquid coolant that was injected and supplied.

As described above, the rotary electric machine 10 of the embodiment includes the first coil end cover 24f and the second coil end cover 24s having insulation and configured to cover the outer circumferences of the coil ends 18f and 18s of the coil 17, and the liquid coolant passages 25 through which the liquid coolant flows toward the coil ends 18f and 18s are installed in the first coil end cover 24f and the second coil end cover 24s. For this reason, the liquid coolant can be smoothly spread in a wide range of circumferential regions of the coil ends 18f and 18s. In particular, in the rotary electric machine 10 of the embodiment, since the first coil end cover 24f and the second coil end cover 24s are formed of an insulating material such as an insulating resin or the like, the first coil end cover 24f and the second coil end cover 24s can be disposed sufficiently close to the coil ends 18f and 18s to which a high voltage is applied. As a result, the liquid coolant can be more smoothly spread in a wide range of the circumferential regions of the coil ends 18f and 18s.

Accordingly, when the rotary electric machine 10 of the embodiment is employed, portions of the coil ends 18f and 18s of the coil 17 can be stably cooled by the liquid coolant.

In addition, in the rotary electric machine 10 of the embodiment, since parts (the communication holes 25e) of the liquid coolant passages 25 of the first coil end cover 24f and the second coil end cover 24s are disposed to come into contact with the end surface of the stator core 16, the end surface of the stator core 16 can be efficiently cooled.

In addition, in the rotary electric machine 10 of the embodiment, the first coil end cover 24f and the second coil end cover 24s are formed to cover the entire outer circumferences of the corresponding coil ends 18f and 18s. For this reason, the liquid coolant can be easily and securely distributed throughout the outer circumferences of the coil ends 18f and 18s. Accordingly, when a structure of the embodiment is employed, the coil ends 18f and 18s can be more efficiently cooled by the liquid coolant.

Further, the rotary electric machine 10 of the embodiment has a structure in which the first coil end cover 24f configured to cool the coil end 18f of one side and the second coil end cover 24s configured to cool the coil end 18s of the other side are connected by the liquid coolant pipe 28. For this reason, when the structure of the embodiment is employed, the coil end 18f of one end side and the coil end 18s of the other end side of the stator 11 in the axial direction can be efficiently cooled by a compact structure.

Further, in the rotary electric machine 10 of the embodiment, since the liquid coolant discharge hole 29 configured to discharge the liquid coolant to the outer surface of the stator core 16 is formed in the liquid coolant pipe 28, the stator core 16 can also be efficiently cooled from the outer surface side by the liquid coolant discharged from the liquid coolant discharge hole 29 of the liquid coolant pipe 28.

In addition, the rotary electric machine 10 of the embodiment has a structure in which the rotor-side liquid coolant passage 22 is provided in the rotor 12 and the liquid coolant is supplied to the inner circumferential sections of the coil ends 18f and 18s through the rotor-side liquid coolant passage 22. For this reason, the coil ends 18f and 18s can also be cooled by the liquid coolant from the inner circumferential side in addition to from the outer circumferential side. Accordingly, when the configuration of the embodiment is employed, performance with respect to the coil ends 18f and 18s can be increased.

Figure 3:
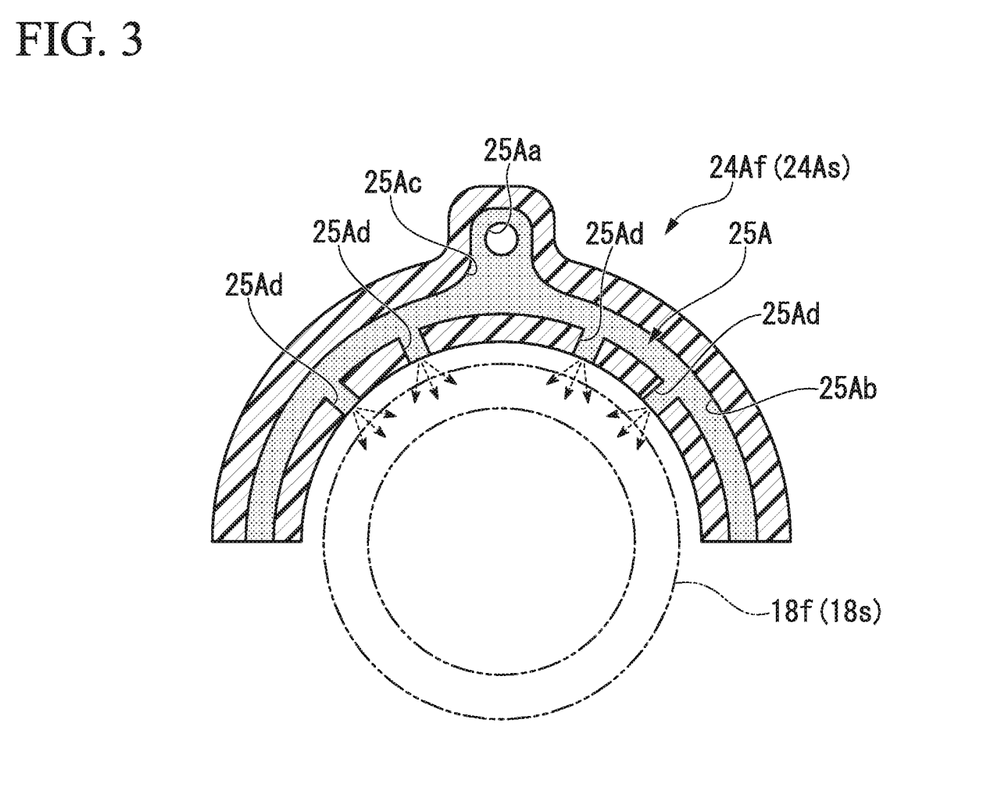
FIG. 3 is a cross-sectional view of a rotary electric machine of a second embodiment of the present invention corresponding to FIG. 2 of the first embodiment.

FIG. 3 is a cross-sectional view of a first coil end cover 24Af of a rotary electric machine of a second embodiment corresponding to FIG. 2 of the first embodiment. Additionally, in the embodiment, a second coil end cover 24As has the same structure as that of the first coil end cover 24Af.

While the rotary electric machine of the embodiment has substantially the same basic configuration as that of the first embodiment, the rotary electric machine has a structure in which the first coil end cover 24Af and the second coil end cover 24As cover only outer circumferences of substantially upper half sections of the corresponding coil ends 18f and 18s. Specifically, the first coil end cover 24Af and the second coil end cover 24As are formed in a substantially arc shape and an arc hole 25Ab is formed therein while the arc hole 25Ab is formed instead of the annular hole of the first embodiment, and an injection hole 25Ad, a connecting passage 25Ac, a liquid coolant introduction hole 25Aa, or the like, in communication with the arc hole 25Ab are formed therein.

The arc hole 25Ab, the injection hole 25Ad, the connecting passage 25Ac, the liquid coolant introduction hole 25Aa, and so on, constitute the liquid coolant passage 25A according to the second embodiment.

Since the rotary electric machine of the embodiment is slightly more disadvantageous than the first embodiment in spreading performance of the liquid coolant with respect to lower half sections of the coil ends 18f and 18s but the first coil end cover 24Af and the second coil end cover 24As can be reduced in size, the rotary electric machine of the embodiment is advantageous in mountability on the vehicle.

Figure 4:
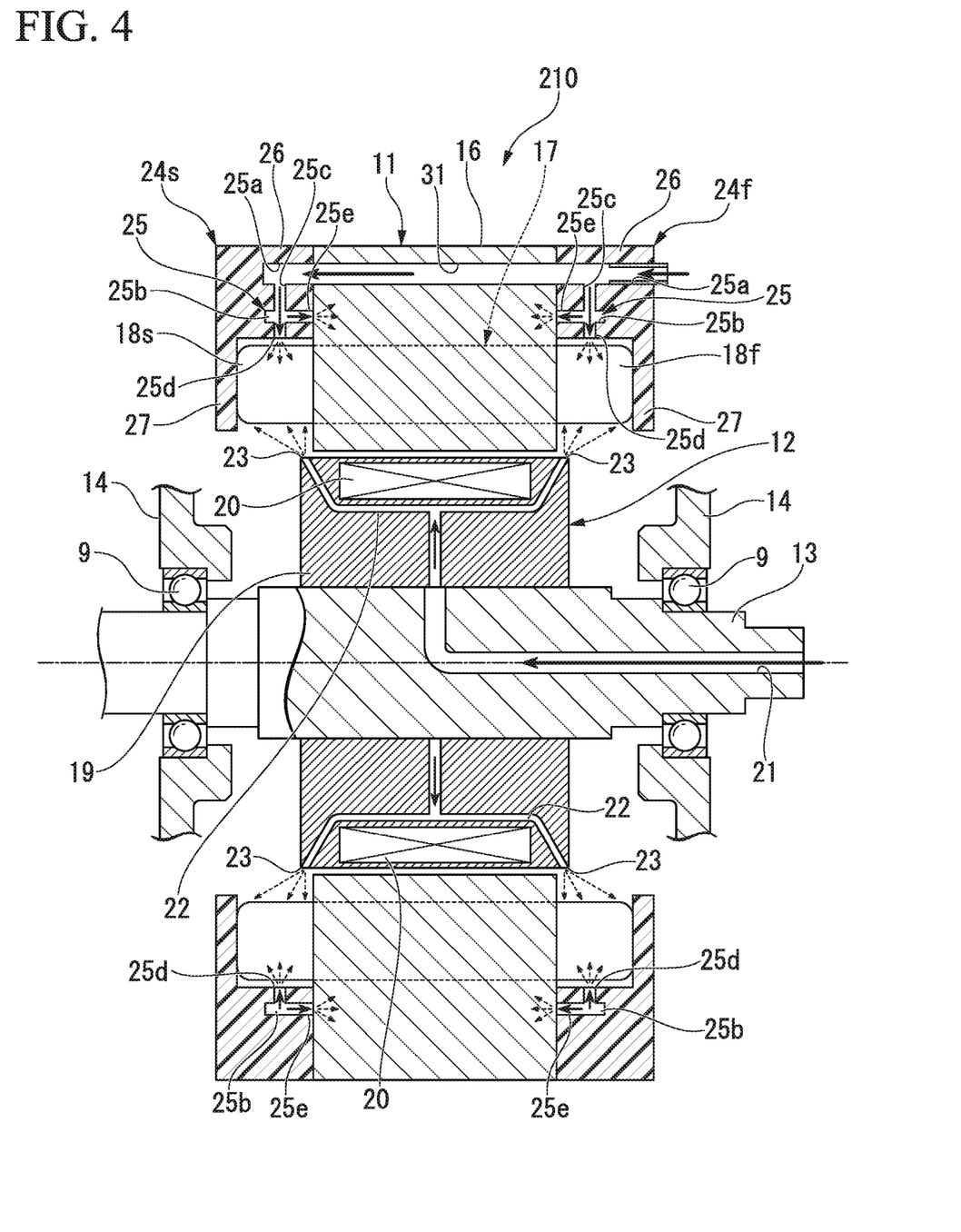
FIG. 4 is a longitudinal cross-sectional view of a rotary electric machine of a third embodiment of the present invention.

FIG. 4 is a view showing a longitudinal cross section of a rotary electric machine 210 of a third embodiment in the axial direction.

While the rotary electric machine 210 of the embodiment has substantially the same basic configuration as that of the first embodiment, the rotary electric machine 210 is distinguished from the first embodiment in that the liquid coolant passage 25 of the first coil end cover 24f and the liquid coolant passage 25 of the second coil end cover 24s are connected by a core passage 31 in the stator core 16. The core passage 31 is a passage formed in the stator core 16 in the axial direction. The core passage 31 introduces some of the liquid coolant introduced to the liquid coolant introduction hole 25a of the first coil end cover 24f to the liquid coolant introduction hole 25a of the second coil end cover 24s.

Since the rotary electric machine 210 of the embodiment has the liquid coolant passage 25 of the first coil end cover 24f and the liquid coolant passage 25 of the second coil end cover 24s that are connected by the core passage 31 in the stator core 16, the liquid coolant can be supplied to the coil end 18f of one end side and the coil end 18s of the other end side by a compact configuration in which a cooling pipe does not occupy the upper section of the stator core 16. In addition, in the rotary electric machine 210 of the embodiment, the stator core 16 can be efficiently cooled by the liquid coolant flowing through the core passage 31.

Figure 5:
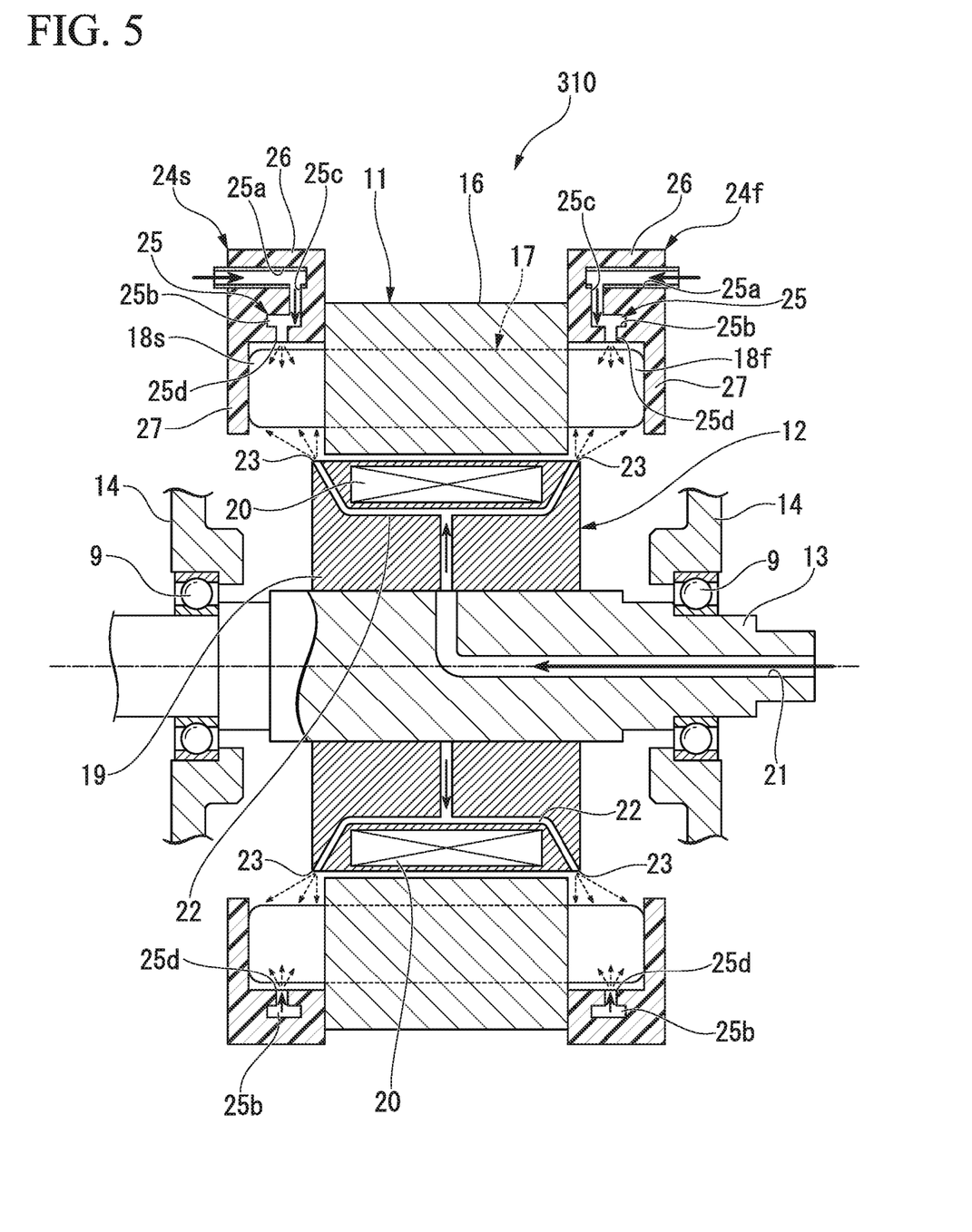
FIG. 5 is a longitudinal cross-sectional view of a rotary electric machine of a fourth embodiment of the present invention.

FIG. 5 is a view showing a longitudinal cross section of a rotary electric machine 310 of a fourth embodiment in the axial direction.

While the rotary electric machine 310 of the embodiment has substantially the same basic configuration at that of the first embodiment, the rotary electric machine 310 is distinguished from the first embodiment in that the liquid coolant introduction holes 25a of the first coil end cover 24f and the second coil end cover 24s are provided to open to an end surface in the axial direction on an outer side, and liquid coolant introduction pipelines are individually connected to openings thereof.

The rotary electric machine 310 of the embodiment has an advantage that a liquid coolant pipe does not occupy an upper side of the stator core 16 and an upper space of the stator core 16 can be effectively used because liquid coolant introduction pipelines are individually connected to the first coil end cover 24f and the second coil end cover 24s.

Figure 6:
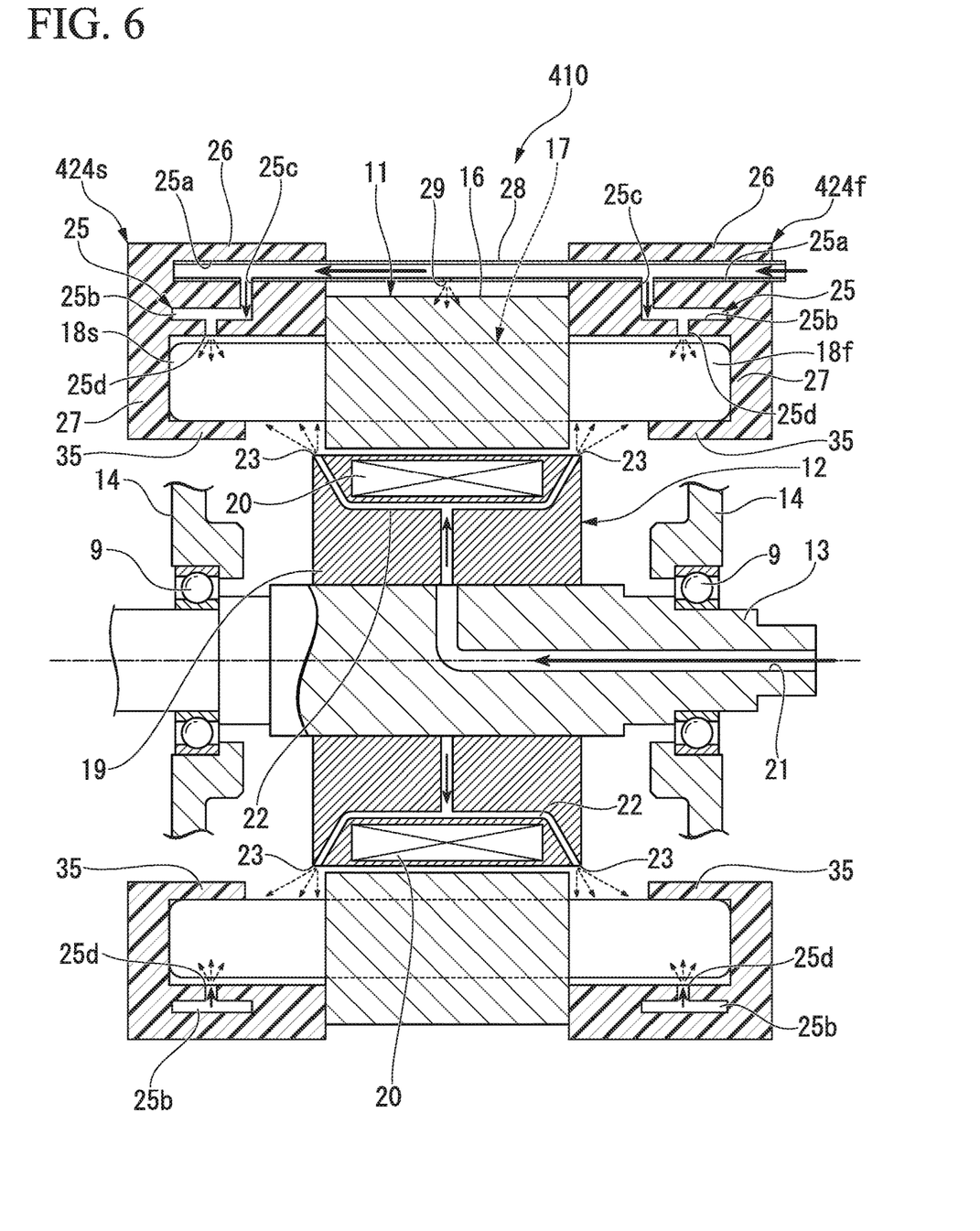
FIG. 6 is a longitudinal cross-sectional view of a rotary electric machine of a fifth embodiment of the present invention.

FIG. 6 is a view showing a longitudinal cross section of a rotary electric machine 410 of a fifth embodiment in the axial direction.

While the rotary electric machine 410 of the embodiment has substantially the same basic configuration as the first embodiment, the rotary electric machine 410 is distinguished from the first embodiment in that an inner circumferential wall 35 is consecutively connected to lower ends of end walls 27 of a first coil end cover 424f and a second coil end cover 424s. The inner circumferential wall 35 is consecutively provided on a lower end of the end wall 27 and covers inner circumferential regions close to outer sides of the coil ends 18f and 18s in the axial direction from the inside in the radial direction. Further, regions of the inner circumferential region of the coil ends 18f and 18s further inside than the inner circumferential wall 35 in the axial direction are cooled by the liquid coolant injected from the rotor-side liquid coolant passage 22 during rotation of the rotor 12.

Since the rotary electric machine 410 of the embodiment can cover the inner circumferential regions of the coil ends 18f and 18s using the inner circumferential walls 35 of the first coil end cover 424f and the second coil end cover 424s, parts of the coil ends 18f and 18s of the coil 17 can be stably cooled by the liquid coolant.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description and is only limited by the scope of the appended claims.

What is claimed is:

1. A rotary electric machine comprising:
a rotor that rotates integrally with a rotary shaft; and
a stator disposed outside the rotor in a radial direction,
a stator core of the stator is wound by a coil and a coil end of the coil exposed to an outside from an end portion of the stator core is cooled by a liquid coolant, and
wherein a coil end cover formed of an insulating material and configured to cover at least an outer circumference of an upper region of the coil end is further provided, and
a liquid coolant passage through which a liquid coolant flows toward the coil end is provided in the coil end cover,
the coil end cover comprises a first coil end cover configured to cover the coil end of one end side of the stator in an axial direction and a second coil end cover configured to cover the coil end of the other end side of the stator in the axial direction,
the liquid coolant passage of the first coil end cover and the liquid coolant passage of the second coil end cover are connected with each other by a liquid coolant pipe configured to supply the liquid coolant to the liquid coolant passages of the first coil end cover and the second coil end cover,
a liquid coolant discharge hole configured to discharge the liquid coolant to the stator core is formed in the liquid coolant pipe, and
the liquid coolant discharge hole is formed in a halfway section of the liquid coolant pipe that faces an upper surface of the stator core.

2. The rotary electric machine according to claim 1, wherein a part of the liquid coolant passage is provided to come into contact with an end surface of the stator core.

3. The rotary electric machine according to claim 1, wherein the coil end cover is formed to cover an entire outer circumference of the coil end.

4. The rotary electric machine according to claim 1, wherein a rotor-side liquid coolant passage configured to inject and supply a liquid coolant to an inner circumferential section of the coil end is provided in the rotor.

5. The rotary electric machine according to claim 1, wherein the liquid coolant pipe is arranged so as to cross over an upper surface of the stator core.

* * * * *